United States Patent [19]

Brunelle

[11] Patent Number: 5,498,651
[45] Date of Patent: Mar. 12, 1996

[54] METHOD FOR POLYMERIZING MACROCYCLIC POLYESTER OLIGOMERS

[75] Inventor: Daniel J. Brunelle, Burnt Hills, N.Y.

[73] Assignee: General Electric Company, Schenectady, N.Y.

[21] Appl. No.: 497,694

[22] Filed: Jun. 19, 1995

[51] Int. Cl.[6] .................................................. C08K 5/00
[52] U.S. Cl. ......................... 524/176; 525/437; 525/449; 524/178; 524/742; 524/751; 524/755
[58] Field of Search .................................. 525/437, 449; 524/176, 178, 742, 751, 755

[56] References Cited

U.S. PATENT DOCUMENTS 5,039,783  8/1991  Brunelle et al. ..................... 528/272
5,387,666  2/1995  Takekoshi et al. ................... 528/283

Primary Examiner—Samuel A. Acquah
Attorney, Agent, or Firm—Edward A. Squillante, Jr.; William H. Pittman

[57] ABSTRACT

A method for polymerizing macrocyclic polyester oligomers comprising the step of contacting macrocyclic polyester oligomers and polymerization catalysts in the presence of epoxides and/or thioepoxides.

12 Claims, No Drawings

METHOD FOR POLYMERIZING MACROCYCLIC POLYESTER OLIGOMERS

This invention was made with government support under Contract No. 70NANB2H1237 awarded by the U.S. Government. The government has certain rights in this invention.

FIELD OF THE INVENTION

The instant invention is directed to a process for making polyesters. The process employs epoxides or episulfides which unexpectedly result in improved polymerization of molten macrocyclic polyester oligomers.

BACKGROUND OF THE INVENTION

Polyesters such as poly(alkylene terephthalates) are well known commercially available polymers. They have valuable characteristics including strength, toughness, high gloss and solvent resistance. Polyesters are commercially prepared by the reaction of diols with functional derivatives of dicarboxylic acids, diacid halides or esters. Further, the above-described polyesters may be fabricated into articles by a number of well known techniques including injection and roto molding and extrusion.

In recent years, macrocyclic polyester oligomers have been developed and desired since they have unique properties which make them attractive as matrices for polymer composites. The desired properties stem from the fact that macrocyclic polyester oligomers exhibit low viscosities when compared to those of corresponding polymers. Such low viscosities allow them to easily impregnate dense fibrous preforms.

As a result of their properties, and particularly their low viscosities, it has been of increasing interest to utilize macrocyclic polyester oligomers as precursors for branched and linear polyesters. This is true because macrocyclic polyester oligomers may first be employed to fill a preform, and subsequently polymerized to high molecular weight polyesters displaying the above-mentioned properties. Notwithstanding, it is often difficult to polymerize macrocyclic polyester oligomers due to impurities which may be present and their decreased ability to polymerize after prolonged heating. It is of increasing interest, therefore, to make polyesters by a method which results in improved polymerization of molten macrocyclic polyester oligomers. Additionally, it is particularly desirable to obtain such results when using titanium comprising catalysts since such catalysts are generally preferred when polymerizing macrocyclic polyester oligomers.

DESCRIPTION OF THE PRIOR ART

Efforts have been disclosed for preparing polyesters. In U.S. Pat. Nos. 5,387,666 and 5,039,783, the disclosures of which are incorporated herein by reference, tin catalysts are employed for the preparation of polyesters from macrocyclic polyester oligomers.

Other investigators have focused on the preparation of polyesters. In U.S. patent application Ser. No. 08/369,986, polyesters are prepared by contacting macrocyclic polyester oligomers and a polymerization catalyst at a temperature within the range of about 160°–300° C.

SUMMARY OF THE INVENTION

The instant invention is directed to a process for making polyesters comprising the step of contacting in the presence of at least one compound selected from the group consisting of epoxides and episulfides:

(a) macrocyclic polyester oligomers; and
(b) polymerization catalysts.

DETAILED DESCRIPTION OF THE PREFERRED EMBODIMENTS

The macrocyclic polyester oligomers which may be employed in this invention are preferably macrocyclic poly(alkylene dicarboxylate) oligomers comprising structural units of the formula

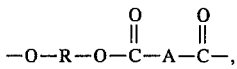

wherein R is an alkylene or mono- or polyoxyalkylene radical containing a straight chain of about 2–8 atoms and A is a m- or p-linked monocyclic aromatic or alicyclic radical. Hence, it is preferred that the macrocyclic polyester oligomers are of the family consisting of polymeric glycol terephthalates or isophthalates and mixtures thereof including copolyesters of terephthalic and isophthalic acids. They are typically characterized by an Mn value of less than about 1500 but preferably about 300 to about 800. Especially preferred oligomers employed in the instant invention are macrocyclic poly( 1,2-ethylene 2,6-naphthalene dicarboxylate) (PEN), poly(ethylene terephthalate) (PET) and poly (1,4-butylene terephthalate) (PBT) oligomers and copolyesters comprising the same.

The oligomers may be prepared by a method which comprises contacting at least one diol of the formula HO—R—OH and at least one diacid chloride of the formula

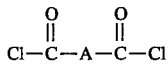

under substantially anhydrous conditions and in the presence of a substantially water immiscible organic solvent, with at least one unhindered tertiary amine; said contact being conducted at a temperature from about −25° to about +25° C.

Other reagents used to synthesize the macrocyclic poly(alkylene dicarboxylate) oligomers employed in the instant invention include unhindered tertiary amines and substantially water-immiscible organic solvents. A detailed description for the preparation of the above-mentioned macrocyclic polyester oligomers employed in this invention may be found in commonly assigned U.S. Pat. No. 5,039,783, the disclosure of which is incorporated herein by reference.

There is no limitation with respect to the catalysts which may be employed in this invention other than that they are those which are capable of enhancing the polymerization of the macrocyclic polyester oligomers described above.

The often employed catalysts include organotin compounds and titanate catalysts. Illustrative organotin compounds are dialkyltin(IV) oxides such as di-n-butyltin(IV) oxide and di-n-octyltin oxide and acyclic and cyclic dialkyltin(IV) dialkoxides such as di-n-butyltin(IV) di-n-butoxide and 2,2-di-n-butyl-2-stanna-1,3-dioxacycloheptane tributyltin ethoxide. Illustrative titanate catalysts include isopropyl titanate, 2-ethylhexyl titanate, and tetrakis-(2-ethylhexyl)titanate.

Other catalysts which may be employed in this invention include dialkyltin alkoxides, stannaoxacycloalkanes and spirotin compounds. Such other catalysts are described in U.S. Pat. No. 5,407,984, the disclosure of which is incorporated herein by reference.

There is essentially no limitation with respect to the epoxides or thioepoxides which may be employed in this invention other than that they do not decompose within the temperature range at which the polymerizations occur.

Epoxides which may be employed in this invention include, for example, non-halogenated and halogenated alkylene oxides like oxirane, propylene oxide, epichloro-, epifluoro- and epibromohydrin, compounds with epoxy groups attached to cyclic residues like cyclohexane oxide and related cycloaliphatic resins, terminal epoxides like glycidyl compounds and epoxides of α-olefins and compounds with non-terminal epoxy groups attached to noncyclic carbon chains.

Other epoxides which may be employed in this invention include aliphatic diepoxides such as dodecatriene dioxide, dipentene dioxide and 1,2,7,8-diepoxyoctane; bis-glycidyl ethers/esters such as the bisglycidyl ether of bisphenol A and its condensation products; alicyclic diepoxides such as 3,4-epoxycyclohexyl 3,4-epoxycyclohexanecarboxylate and bis(3,4-epoxycyclohexylmethyl) adipate; mixed aliphatic/alicyclic diepoxides such as vinylcyclobutene dioxide, vinylcyclopentadiene dioxide and butenylcyclopentene dioxide; glycidyl ethers of novolak resins; epoxidized heterocycles such as triglycidyl isocyanurate; and epoxidized oils such as epoxidized tall oil, linseed oil and soybean oil.

Still other epoxides which may be employed in this invention include, for example, alicyclic epoxides which may be hindered, less-hindered or unhindered as defined in The Determination of Epoxide Groups, B. Dobinson et al., Pergamon Press, 1969.

It is also within the scope of this invention to employ the thio analogs of the epoxides described above wherein thio analog is defined herein to mean the oxygen of the epoxide is replaced with sulfur. Moreover, it is not necessary to employ epoxidation co-catalysts like tetrabutylphosphonium bromide in this invention.

The preferred epoxides and episulfides employed in this invention often have the formula

A—B—A, wherein each A is independently

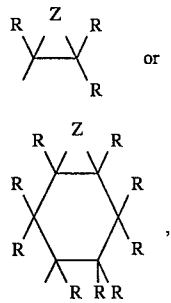

and each R is independently a hydrogen, halogen, hydroxy group, alkoxy group, $C_{1-10}$ hydrocarbon or substituted or unsubstituted aromatic radical and Z is oxygen or sulfur.

B is a divalent bridging radical or group, wherein the divalent bridging radical is not limited and often a substituted or unsubstituted —C— or alicyclic or aromatic radical and the bridging group is not limited and often a substituted or unsubstituted polycyclic, polyaromatic or aliphatic group. Said bridging group may also be a member having the formulae

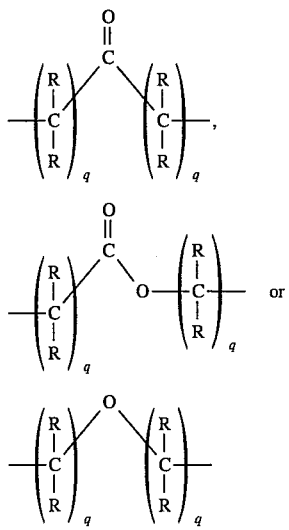

wherein R is as previously defined and each q is independently about 0 to about 30 and often 0 or 1.

The often preferred epoxide employed in this invention is commercially available and is 3,4-epoxycyclohexyl 3,4-epoxycyclohexylcarboxylate.

When conducting the instant novel method, a reaction vessel may be charged with the macrocyclic polyester oligomers, polymerization catalysts and epoxide and/or episulfide and their order of addition is not material. Heat is supplied to melt the oligomers (about 135° C. to about 250° C.) for polymerization and stirring may be employed under an inert gas in order to enhance the polymerization of the oligomers to produce the desired polymer. Additionally, the epoxides and polymerization catalysts employed in this invention may first be dissolved in a solvent such as o-dichlorobenzene in order to enhance mixing.

The amount of epoxides and/or thioepoxides employed in this invention are often about 0.01 to about 3.0 mole % and preferably about 0.02 to about 1.0 mole % and most preferably about 0.1 to about 0.25 mole % based on total moles of monomer units of oligomer.

The amount of polymerization catalyst employed in this invention is often about 0.01 to about 5.0 mole % and preferably about 0.02 to about 2.0 mole % and most preferably about 0.2 to about 0.5 mole % based on total moles of monomer units of oligomer.

Further, it is noted herein that the unexpected and superior results in this invention which include increased polymerization and increased melt stabilities of the oligomers are apparently the result of the conversion of any impurities to esters. Such impurities include carboxylic acids, anhydrides and acid halides which invariably passivate the melt polymerization by destroying catalyst present in the reaction. Additionally, as set forth in Entry 13 of the Table which follows, plasticizers such as dioctylphthalate which are commonly employed to reduce melt temperature of oligomers do not enhance the polymerizations of the oligomers as described in this invention.

The desired polyesters produced in this invention often include poly(ethylene terephthalate), poly(1,4-butylene terephthalate), poly(1,2-ethylene 2,6-naphthalene dicarboxylate) and copolyesters comprising the same.

The following examples are provided to further illustrate and facilitate an understanding of the instant invention. The products obtained may be confirmed by conventional techniques such as proton and carbon-13 nuclear magnetic resonance spectroscopy, mass spectroscopy and infrared spectroscopy. They were confirmed via GPC analysis.

EXAMPLE 1

A 25 mL flask was charged with 5.0 g of macrocyclic copolyester oligomer (PET/PBT, 5% by wt. PET). The oligomer was heated at 100° C. in an oil bath under vacuum for about 10 minutes and at 190° C. for an additional 10 minutes. Vacuum was released, and the oligomer was completely molten. To the molten oligomer was added 46 μL of a 1.0M solution of 3,4-epoxycyclohexyl 3,4-epoxycyclohexylcarboxylate and o-dichlorobenzene (0.20 mole % epoxy). The resulting mixture was stirred for about 5 minutes after which 69 μL of a 1M solution of tetrakis-(2-ethylhexyl)titanate and O-dichlorobenzene (0.30 mole % titanate) were added. The mixtrure with titanate was stirred and crystalline polymer formed within 10 seconds. After about 40 minutes, the flask was removed from the oil bath and was broken to retrieve a sample of polymer. The polymer was dissolved in a solution of 15% hexafluoroisopropanol and 85% chloroform. GPC analysis of the resulting solution unexpectedly showed 96.4% polymerization.

EXAMPLE 2

Example 2 was prepared in a manner similar to the one described in Example 1 except that 23 μL of a 1.0M epoxy solution (0.10% epoxy) was used and the co-polyester oligomer/epoxy mixture was stirred for 24 hours at 190° C. after which the polymerization catalyst was added. Heating continued for an additional 40 minutes after which the catalyst addition and GPC analysis of the resulting polymer unexpectedly showed 97.0% polymerization of macrocyclic oligomer.

The data in the table which follows has been compiled to demonstrate the new and unexpected superior results of the instant invention. All entries have been prepared in a manner similar to those described in the examples.

TABLE

| Entry[a,b] | % Epoxide | % Polymerization Catalyst[c] | % Polymerization | Mw[d] |
|---|---|---|---|---|
| 1 | None | c | 39.5 | 61,300/1,382[e] |
| 2 | None | c | 53.4 | 38,900/1,350[e] |
| 3 | 0.20% | c | 96.4 | 352,300 |
| 4 | 0.25% | c | 92.3 | 75,200 |
| 5 | None | c | 47.5 | 48,800 |
| 6 | None | i | 99.0 | 144,000 |
| 7 | 1.0% | c | 99.5 | 81,000 |
| 8 | 0.50% | i | 99.0 | 138,000 |
| 9 | 0.50%[f] | i | 98.0 | 121,700 |
| 10 | 0.25% | c | 100.0 | 215,900 |
| 11 | 0.25%[g] | c | 78.3 | 78,900 |
| 12 | 0.10% | c | 97.0 | 246,000 |
| 13 | None[h] | c | 61.0 | 96,000 |

[a]Entries 1–4, crude PET/PBT co-cyclic, polymerizations at 190° C. for 40 minutes.
[b]Entries 5–8 and 10–12, purified PET/PBT co-cyclic, held molten at 190° C. for 24 hours, polymerization after catalyst addition.
[c]0.30 mole % tetrakis-(2-ethylhexyl)titanate.
[d]Average weight molecular weight based on polystyrene standards.
[e]Bimodal.
[f]Purified PET/PBT co-cyclic, held molten at 175° C. for 24 hours, polymerization after catalyst addition.
[g]0.0025% tetrabutylphosphonium bromide epoxidation co-catalyst.
[h]Purified PET/PBT co-cyclic, dioctylphthalate plasticizer additive to decrease melt temperature, held molten at 175° C. for 24 hours, polymerization after catalyst addition.
[i]0.50 mole % tributyltin ethoxide.

What is claimed is:

1. A method for polymerizing macrocyclic polyester oligomers comprising the step of contacting in the presence of at least one compound selected from the group consisting of epoxides and episulfides:
   (a) macrocyclic polyester oligomers; and
   (b) polymerization catalysts.

2. A method in accordance with claim 1 wherein said macrocyclic polyester oligomers are poly(alkylene dicarboxylate) oligomers.

3. A method in accordance with claim 2 wherein said poly(alkylene dicarboxylate) oligomers are macrocyclic poly(1,2-ethylene terephthalate), poly(1,4-butylene terephthalate), poly(1,2-ethylene- 2,6-naphthalene dicarboxylate) or copolyester oligomers comprising the same.

4. A method in accordance with claim 1 wherein said polymerization catalysts are organotin compounds or titanate catalysts.

5. A method in accordance with claim 4 wherein said polymerization catalysts are dialkyltin(IV)oxides, acyclic and cyclic dialkyltin(IV)dialkoxides, isopropyl titanate, 2-ethylhexyl titanate, tetrakis-(2-ethylhexyl) titanate, stannaoxacycloalkanes or spirotin compounds.

6. A method in accordance with claim 1 wherein said epoxides and thioepoxides have the formula

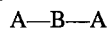

wherein each A is independently

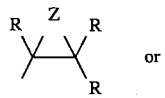

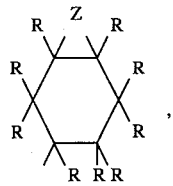

and each R is independently a hydrogen, halogen, hydroxy group, alkoxy group, $C_{1-10}$ hydrocarbon or aromatic radical and Z is oxygen or sulfur and b is a bridging radical or group.

7. A method in accordance with claim 6 wherein said bridging radical is an alicyclic or aromatic radical and said bridging group is a polycyclic, polyaromatic or aliphatic group.

8. A method in accordance with claim 7 wherein said bridging group is a member having the formulae

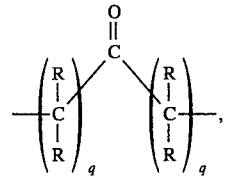

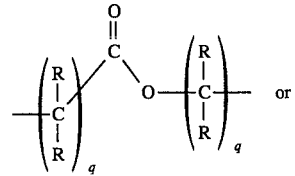

-continued

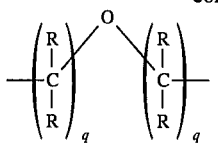

and each q is independently 0 to about 30.

9. A method in accordance with claim 6 wherein said epoxide is 3,4-epoxycyclohexyl 3,4-epoxycyclohexylcarboxylate.

10. A method in accordance with claim 1 wherein said method further comprises the steps of heating and stirring.

11. A method in accordance with claim 1 wherein said at least one compound selected from the group consisting of epoxides and episulfides is present in an amount of about 0.01 mole % to about 3.0 mole % based on total moles of monomer units of macrocyclic polyester oligomers.

12. A method in accordance with claim 1 wherein said polymerization catalyst is present in an amount of about 0.01 mole % to about 5.0 mole % based on total moles of monomer units of macrocyclic polyester oligomers.

* * * * *